United States Patent
Cha et al.

(10) Patent No.: US 9,187,041 B2
(45) Date of Patent: Nov. 17, 2015

(54) RUNNING BOARD MECHANISM FOR VEHICLE

(71) Applicant: Hyundai Motor Company, Seoul (KR)

(72) Inventors: Dong Eun Cha, Suwon-si (KR); Seung Mok Lee, Osan-si (KR); Ki Chang Yi, Busan (KR); Young Wook Song, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/322,715

(22) Filed: Jul. 2, 2014

(65) Prior Publication Data

US 2015/0175077 A1    Jun. 25, 2015

(30) Foreign Application Priority Data

Dec. 20, 2013   (KR) .......................... 10-2013-0160760

(51) Int. Cl.
   *B60R 3/00*        (2006.01)
(52) U.S. Cl.
   CPC ..................................... *B60R 3/002* (2013.01)
(58) Field of Classification Search
   CPC .................................... B60R 3/00; B60R 3/02
   USPC .......................................... 280/163, 166, 762
   See application file for complete search history.

(56) References Cited

U.S. PATENT DOCUMENTS

| 1,867,228 | A | * | 7/1932 | McWhirter | 280/166 |
| 5,046,582 | A | * | 9/1991 | Albrecht | 182/127 |
| 5,339,919 | A | * | 8/1994 | Boyd | 182/85 |
| 6,435,534 | B1 | | 8/2002 | Stone | |
| 2009/0322052 | A1 | * | 12/2009 | Ruehl | 280/166 |

FOREIGN PATENT DOCUMENTS

| JP | 05-208640 A | 8/1993 |
| JP | 10-287183 A | 10/1998 |
| JP | 2009-234519 A | 10/2009 |
| KR | 1997-0026476 A | 6/1997 |
| KR | 10-2005-0031491 A | 4/2005 |

* cited by examiner

*Primary Examiner* — J. Allen Shriver, II
*Assistant Examiner* — Bryan Evans
(74) *Attorney, Agent, or Firm* — Morgan, Lewis & Bockius LLP (57) ABSTRACT

A running board assembly for a vehicle may include a stationary board fixed to a vehicle body, a movable board separately coupled to the stationary board and selectively movable up and down with respect to the stationary board, a stopper pin selectively coupling the movable board and the stationary board to stop a vertical motion of the movable board to a predetermined position, and a stopper pin-manipulation unit included in the movable board and connected to the stopper pin, wherein when the movable board may be subjected to a load, the stopper pin-manipulation unit decouples magnetically the stopper pin from the stationary board, and wherein when the movable board may be not subjected to the load, the stopper pin-manipulation unit maintains a state of the stopper pin being coupled to the stationary board.

9 Claims, 10 Drawing Sheets

RUNNING BOARD MECHANISM FOR VEHICLE

CROSS-REFERENCE(S) TO RELATED APPLICATION

The present application claims priority to Korean Patent Application Number 10-2013-0160760 filed Dec. 20, 2013, the entire contents of which are incorporated herein for all purposes by this reference.

BACKGROUND OF THE INVENTION

1. Field of the Invention

The present invention relates, in general, to a running board mechanism for a vehicle and, more particularly, to a running board mechanism for a vehicle which is designed to vertically move down and return to its original position.

2. Description of Related Art

Figure 1A:
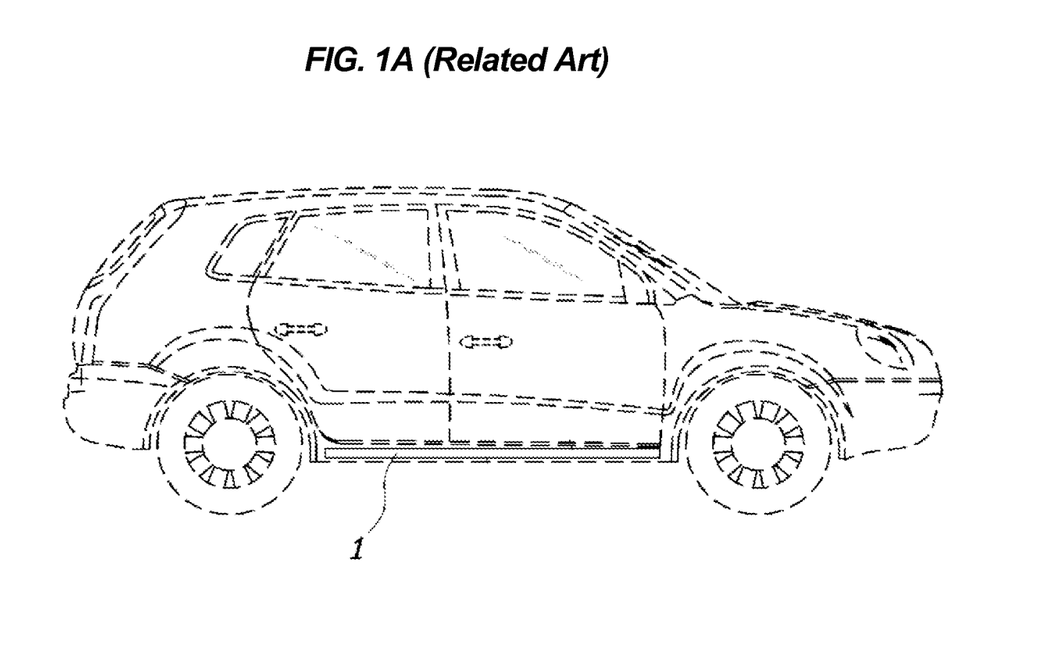
FIG. 1A is a view illustrating a conventional running board mechanism for a vehicle.
Figure 1B:
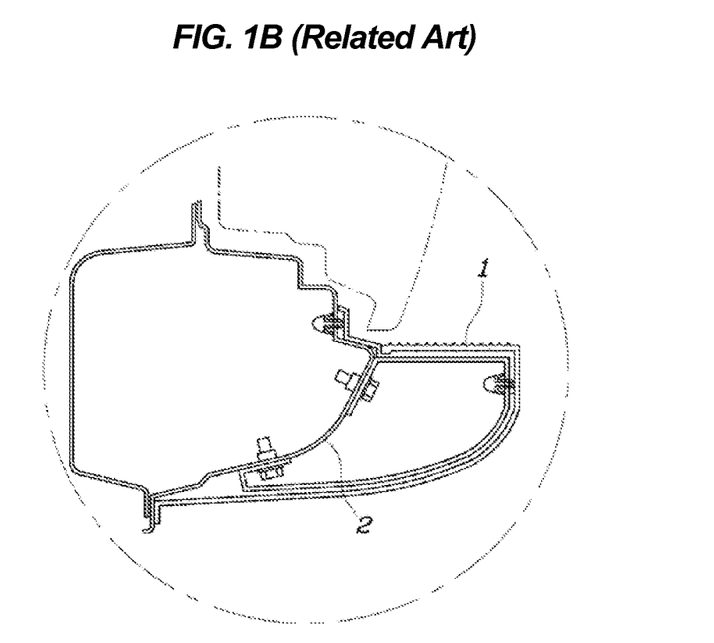
FIG. 1B is an exploded view illustrating a portion of the conventional running board mechanism for a vehicle.
Figure 2A:
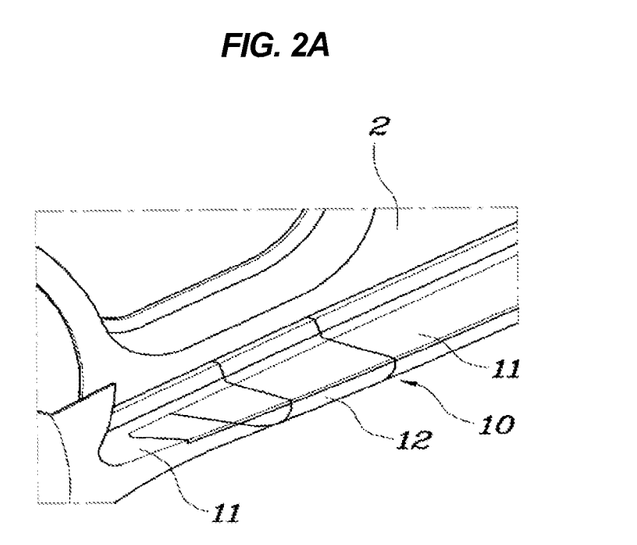
FIG. 2A is a view illustrating a running board mechanism for a vehicle having a movable board according to an exemplary embodiment of the present invention.
Figure 2B:
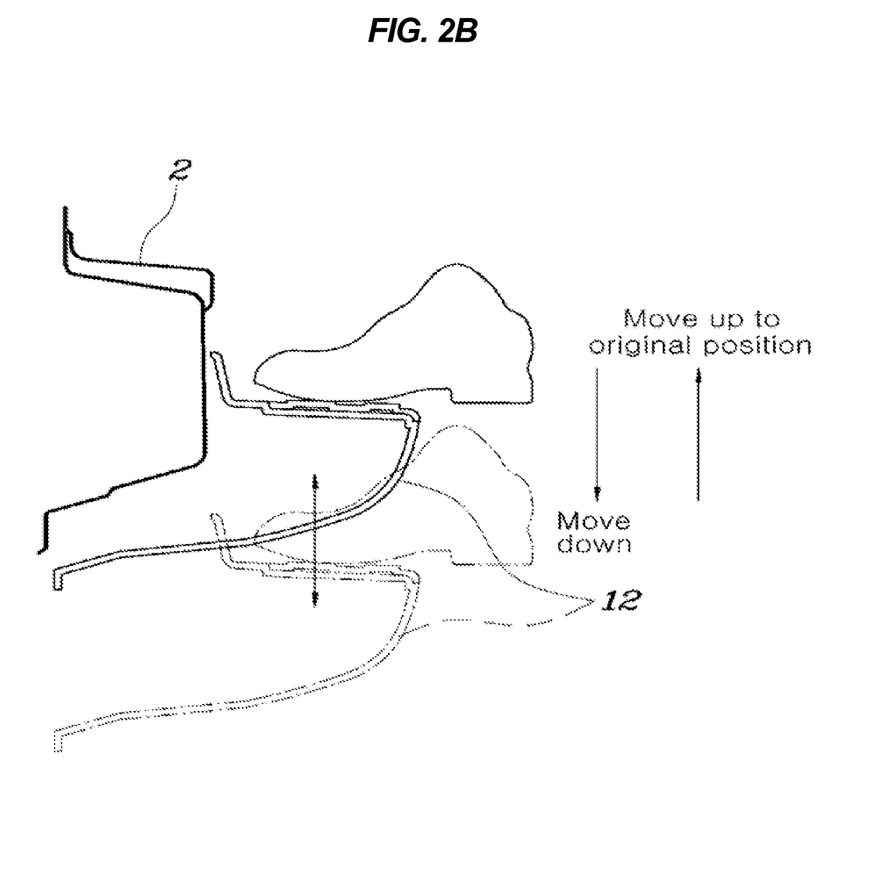
FIG. 2B is a view illustrating operation of the running board mechanism for the vehicle having a movable board according to an exemplary embodiment of the present invention.

Generally, as shown in FIGS. 1A and 1B, a running board 1 aids entry into recreational vehicles (RVs) which have higher ground clearances compared to a sedan.

However, since a conventional running board is simply fixed to a vehicle body 2 (i.e. as a side seal outer panel), there is a drawback in that it is inconvenient for passengers such as the elderly, the disabled and children to step on the running board due to the increased ground clearances and for fear of falling and/or injuring themselves in the process of stepping onto and/or off the running board.

The information disclosed in this Background of the Invention section is only for enhancement of understanding of the general background of the invention and should not be taken as an acknowledgement or any form of suggestion that this information forms the prior art already known to a person skilled in the art

BRIEF SUMMARY

Various aspects of the present invention are directed to providing a running board mechanism for a vehicle, which, when subjected to a load, vertically moves down and returns to its original position, thereby improving convenience of a passenger, particularly the elderly, the disabled and children, when getting on and off a vehicle.

In an aspect of the present invention, 1. A running board assembly for a vehicle, may include a stationary board fixed to a vehicle body, a movable board separately coupled to the stationary board and selectively movable up and down with respect to the stationary board, a stopper pin selectively coupling the movable board and the stationary board to stop a vertical motion of the movable board to a predetermined position, and a stopper pin-manipulation unit may include d in the movable board and connected to the stopper pin, wherein when the movable board is subjected to a load, the stopper pin-manipulation unit decouples magnetically the stopper pin from the stationary board, and wherein when the movable board is not subjected to the load, the stopper pin-manipulation unit maintains a state of the stopper pin being coupled to the stationary board.

The running board assembly may further may include a stationary board guide fixed to the stationary board, and a movable board guide fixed to the stationary board guide, the movable board guide movable along the stationary board guide in a vertical direction of the stationary board guide.

The running board assembly may further include a weight provided adjacent to the stationary board guide and vertically movable along the stationary board guide, and a connection wire connecting the movable board guide and the weight.

The movable board may include a board body to which the movable board guide is fixed, a board cover selectively engaged to an upper portion of the board body, and a board spring placed between the board body and the board cover and elastically biasing the board cover away from the board body to allow the board cover to extend or retract elastically in a vertical direction.

The stopper pin is mounted in the movable board guide, and the stationary board guide may include a plurality of pin-holes formed with a predetermined vertical interval therebetween along a vertical direction of the stationary board guide, wherein the stopper pin is selectively inserted and engaged into one of the pin-holes in accordance with movement of the movable board.

The stopper pin-manipulation unit may include a lower terminal fixedly coupled to an upper portion of the board body, wherein a first side of the lower terminal protrudes upwards from the board body and a second side of the lower terminal is mounted to the board body and electrically connected to a power supply, an upper terminal fixedly coupled to a lower portion of the board cover, wherein a first side of the upper terminal protrudes downwards from the lower portion of the board cover towards the lower terminal, a coil coiled around the upper terminal, a movable body that is slidably mounted in the board cover and movable towards the upper terminal when the lower and upper terminals come into contact and the upper terminal is magnetized by an electric current from the power supply, and a pin wire connecting the stopper pin and the movable body.

The stopper pin-manipulation unit may further include a return spring positioned between the stopper pin and the movable board guide at both first and second sides of the return spring respectively and providing an elastic force to move the stopper pin towards the stationary board guide when the lower and upper terminals which were in contact with each other during magnetization are separated, thus being demagnetized.

The stopper pin-manipulation unit may further include a movable body guide provided to the board cover, the movable body being slidably received in the movable body guide and slides along the movable body guide.

Since the running board mechanism separately may include the stationary board fixed to the vehicle body and the movable board vertically movable relative to the stationary board so that the passenger can get on and off the vehicle while stepping on the downwardly moved movable board, so as to make it convenient for the passenger, particularly the elderly, the disabled and children, to board on the running board when getting on and off a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described with reference to the accompanying drawings so that those skilled in the Field of the Invention to which the present invention pertains may carry out the exemplary embodiment.

The present invention relates to a running board mechanism for a vehicle, which, when subjected to a load, vertically moves down and returns to its original position, thereby improving convenience of a passenger, particularly the elderly, the disabled and children, when getting on and off a vehicle.

As shown in FIGS. 2A to 7B, the running board mechanism for a vehicle to which the technique of the present invention is adapted may have the configuration in which a running board body 10 includes a stationary board 11 and a movable board 12. The stationary board 11 and the movable board 12 that are separately coupled are operated such that, when a passenger applies a load to the movable board 12 while stepping on the movable board 12, the movable board 12 moves down, and when the passenger steps off the movable board, the movable board 12 maintains its lowered position. When the passenger applies a load to the lowered movable board while stepping on the movable board, the movable board 12 moves up again to its original position and when the passenger steps off the elevated movable board, the movable board 12 maintains its original position.

The running board mechanism for the vehicle may include a movable board 12 which is separated from a stationary board 11 that is fixed to the vehicle body 2 and is configured to move up and down with respect to the stationary board 11, a stopper pin 20 which is included in the movable board 12 and is coupled to the stationary board 11 so as to stop a vertical motion of the movable board 12, and a stopper pin-manipulation unit 30 which is included in the movable board 12 so as to be connected with the stopper pin 20 such that when the movable board 12 is subjected to a load, the stopper pin-manipulation unit 30 magnetically moves the stopper pin 20 away from the stationary board 11 through electromagnetism by a magnetic field produced through electric current from the power supply 31. When the movable board 12 is not subjected to a load, the stopper pin-manipulation unit 30 maintains a state of the stopper pin 20 being coupled to the stationary board 11.

Figure 4:
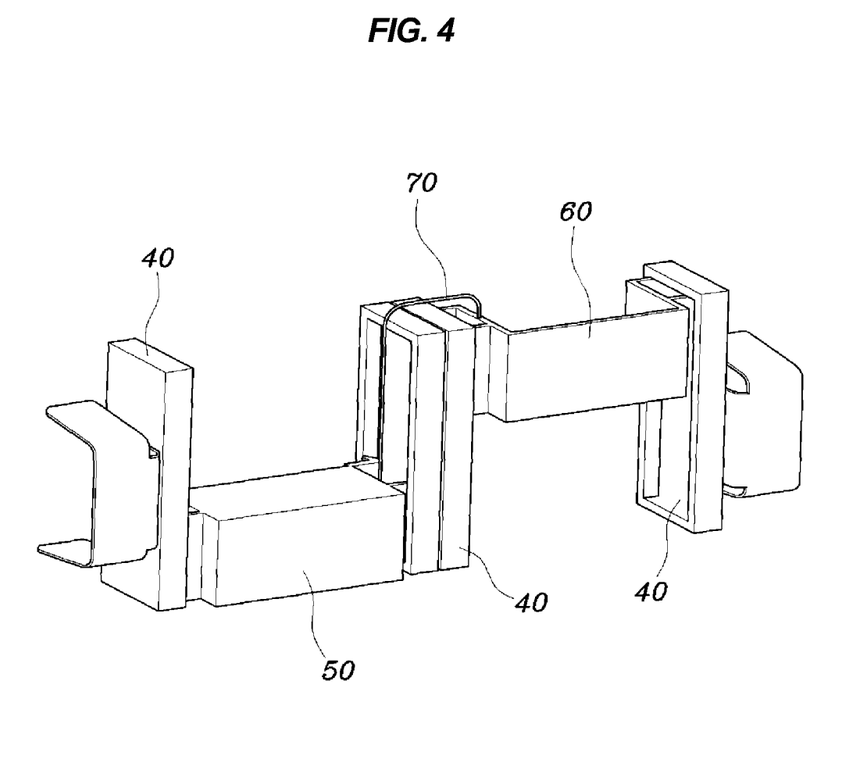
FIG. 4 is a view illustrating a stationary board guide and a movable board guide, and a weight according to an exemplary embodiment of the present invention.

In an aspect of the present invention, as shown in FIG. 4, the running board mechanism may further include a stationary board guide 40 which is vertically and fixedly mounted to the stationary board 11, a movable board guide 50 which is coupled to the stationary board guide 40 so that the movable board guide 50 moves along the stationary board guide 40 in a vertical direction, a weight 60 which is provided in the stationary board 11 so as to move vertically along the stationary board guide 40, and a connection wire 70 which connects the movable board guide 50 to the weight 60.

The movable board 12 may include a board body 12a to which the movable board guide 50 is coupled and a board cover 12c which is coupled to an upper portion of the board body 12a. Board Cover 12c may be constructed with a board spring 12b to allow board cover 12c to extend and retract elastically in a vertical direction. The board cover 12c is a portion of the moveable board 12 on which a passenger can step.

The stopper pin 20 is included in the movable board guide 50, and the stationary board guide 40 is constructed with a plurality of pin-holes 41, positioned at predetermined vertical intervals, into which the stopper pin 20 may be inserted and engaged. In FIGS. 3A, 3B and 7A and 7B, two pin holes 41 are provided on upper and lower parts, respectively, of the stationary board 40 along the vertical direction thereof, without a limitation thereto.

Figure 5:
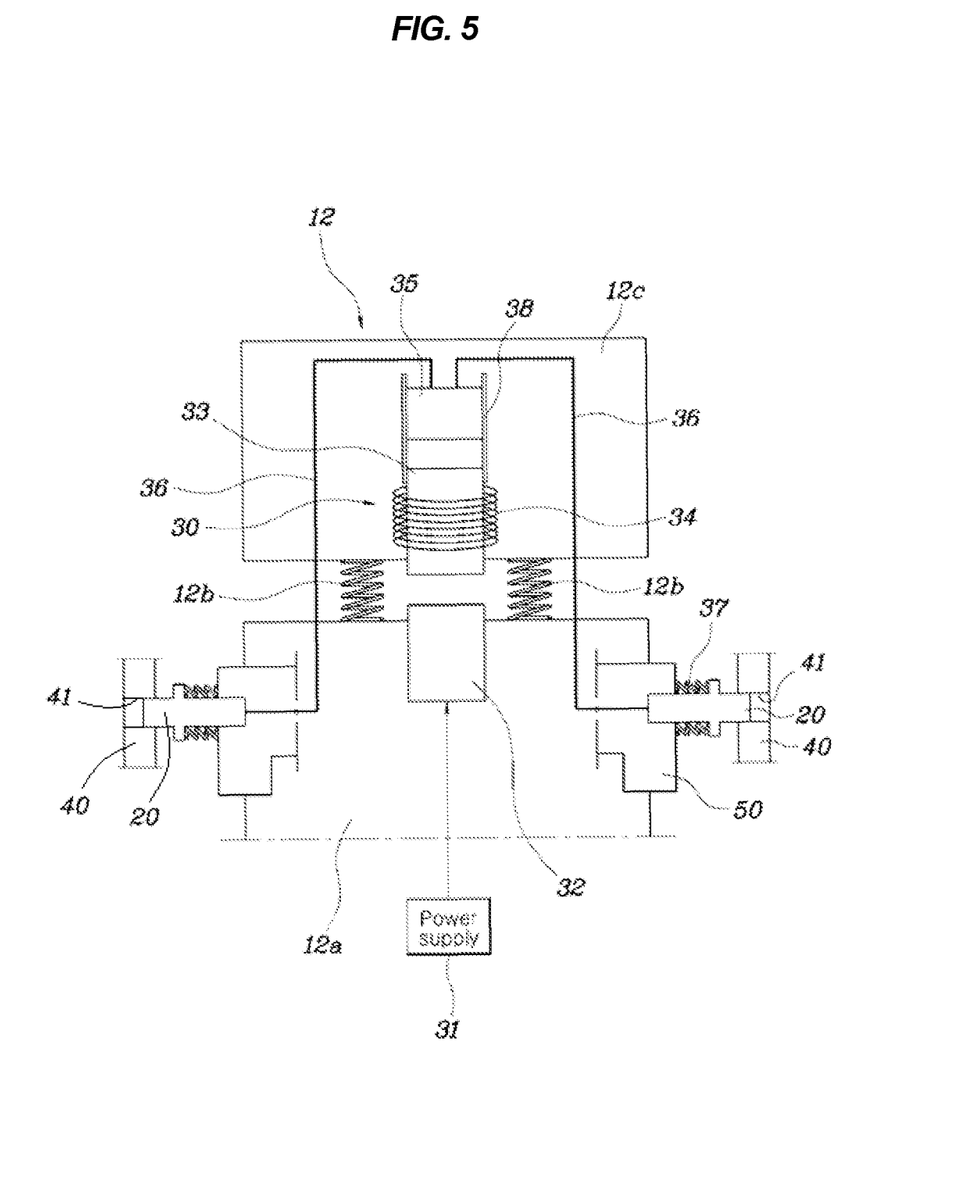
FIG. 5 is a view illustrating a stopper pin-manipulation unit according to an exemplary embodiment of the present invention.
Figure 6:
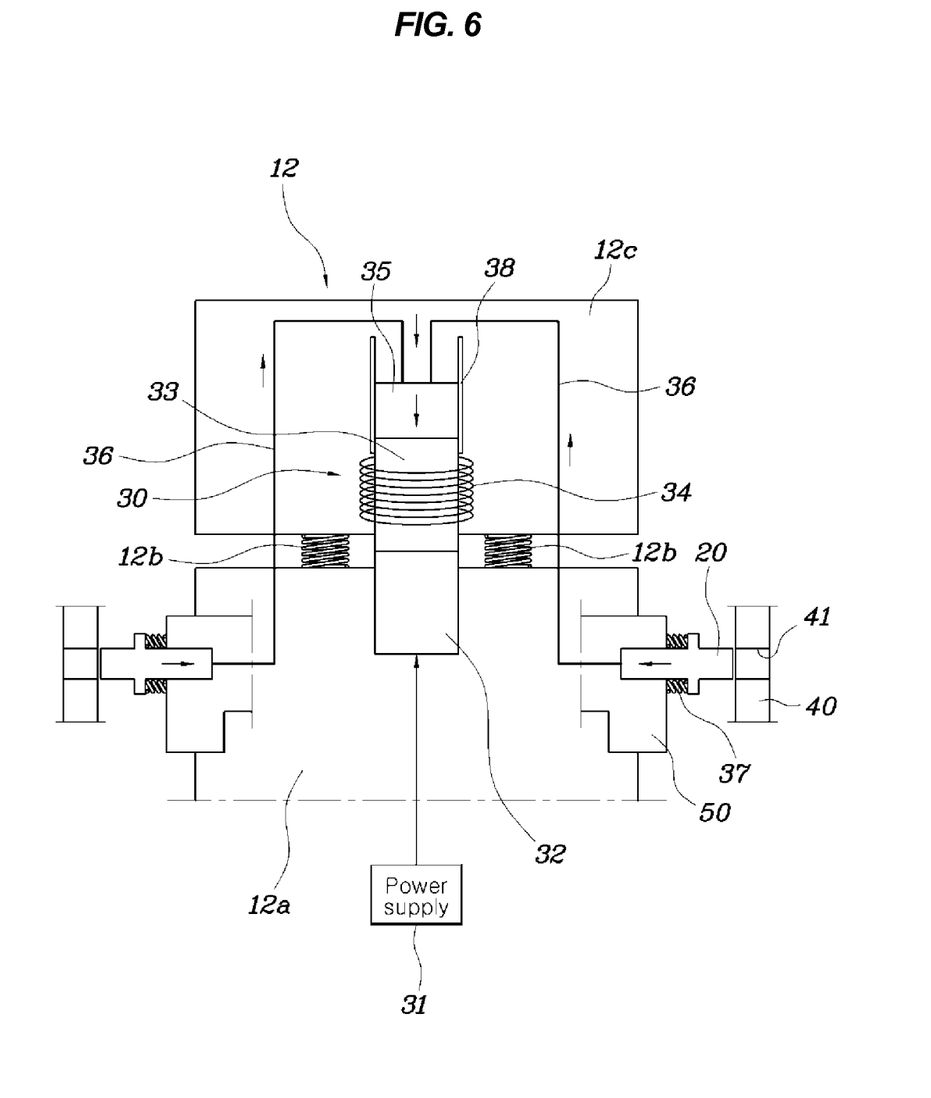
FIG. 6 is a view illustrating the operation of the stopper pin-manipulation unit shown in FIG. 5 according to an exemplary embodiment of the present invention.

As shown in FIGS. 5 and 6, the stopper pin-manipulation unit 30 may include a lower terminal 32 which is fixedly coupled to the board body 12a such that a first side thereof protrudes upwards from the board body 12a and a second side thereof is connected to a power supply 31, an upper terminal 33 which is fixedly coupled to the board cover 12c such that a first side thereof protrudes downwards from the board cover 12c and towards the lower terminal 32, a coil 34 coiled around the upper terminal 33, a movable body 35 which is magnetically movable towards the upper terminal 33—being electrically magnetized through a magnetic field produced by electric current from the power supply 31—when the lower and upper terminals 32 and 33 come into contact, and a pin wire 36 which connects the stopper pin 20 and the movable body 35.

In an exemplary embodiment of the present invention, a ground of the electricity may be connected to the coil 34 through the board cover 12c or through the lower terminal 32 but is not limited thereto.

The stopper pin-manipulation unit may further include a return spring 37 which is supported by and positioned between the stopper pin 20 and the movable board guide 50 at both first and second sides. The return spring provides an elastic force to move the stopper pin 20 towards the stationary board guide 40 when the lower and upper terminals 32 and 33 which were in contact with each other during magnetization are then separated, thus being demagnetized. The stopper pin-manipulation unit may also include a movable body guide 38 which is provided to the board cover 12c so as to guide the motion of the movable body 35.

Figure 3A:
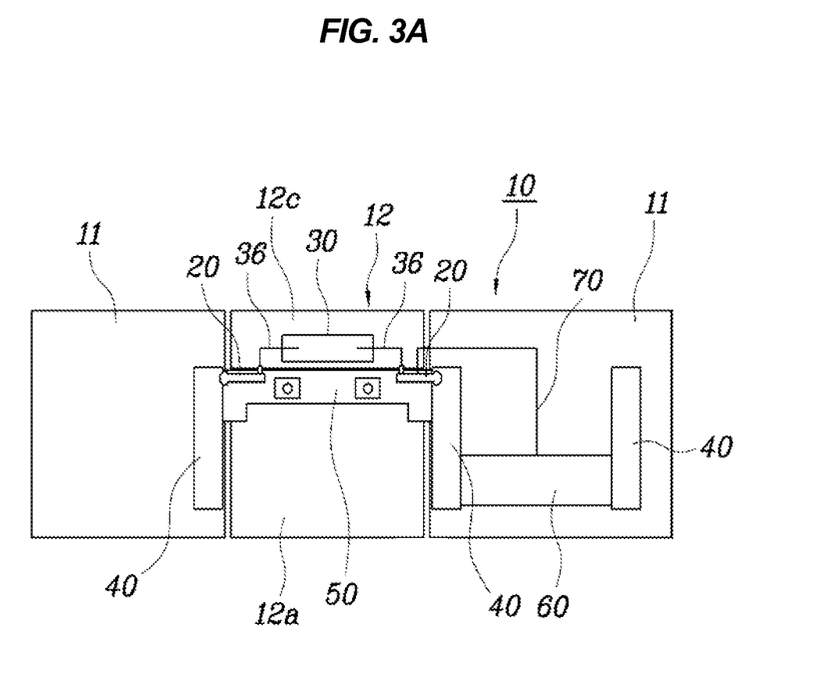
FIG. 3A is a view illustrating a stationary board and a moving board raised from the stationary board when viewed from inside according to an exemplary embodiment of the present invention.
Figure 3B:
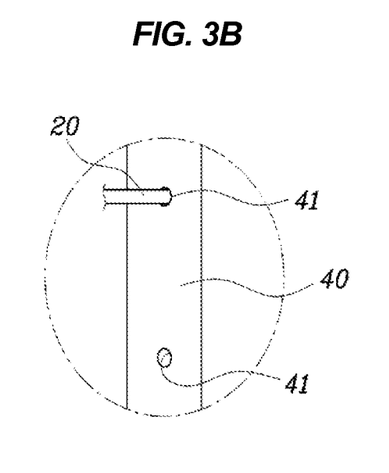
FIG. 3B is an exploded view illustrating a portion of the stationary board and the moving board raised from the stationary board when viewed from inside according to an exemplary embodiment of the present invention.

FIGS. 3A, 3B and 5 illustrate a configuration where the movable board 12 has moved up and maintains a raised position. At this position, the board body 12a and the board cover 12c are separated from each other by an elastic force due to the board spring 12b pushing against the board body 12a and the board cover 12c in opposite directions. The stopper pin 20 is moved towards the stationary board guide 40 and inserted and engaged into the pin hole 41 on the upper side of the stationary board guide 40 by the elastic force due to the return spring 37 pushing on the stopper pin 20.

FIG. 6 is a view illustrating the operation of the stopper pin-manipulation unit shown in FIG. 5 according to an exemplary embodiment of the present invention. When a passenger steps on the board cover 12c, as shown in FIG. 6, the board cover 12c is moved down so that the upper terminal 33 comes into contact with the lower terminal 32 by current flowing through the coil 34, thus electrically magnetizing the lower and upper terminals 32 and 33.

When the lower and upper terminals 32 and 33 become electrically magnetized, the movable body 35 formed from a steel material or any similar material capable of being magnetized is magnetically attracted towards the upper terminal 33, the stopper pin 36 is drawn as the upper terminal 33 moves, so that the stopper pin 20 is moved towards the movable board guide 50 by its drawing force, and thus the stopper pin 20 is decoupled from the pin hole 41.

Figure 7A:
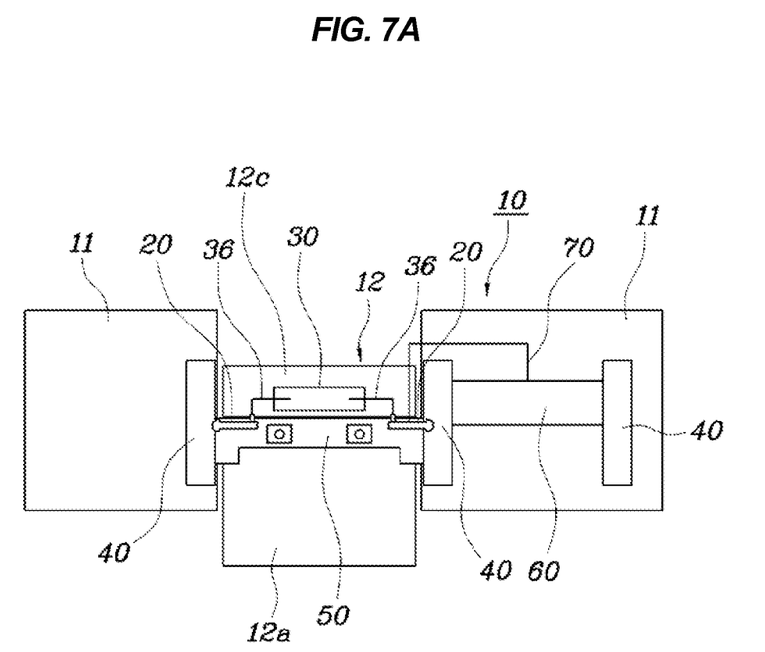
FIG. 7A is a view illustrating the movable board being moved down according to an exemplary embodiment of the present invention.
Figure 7B:
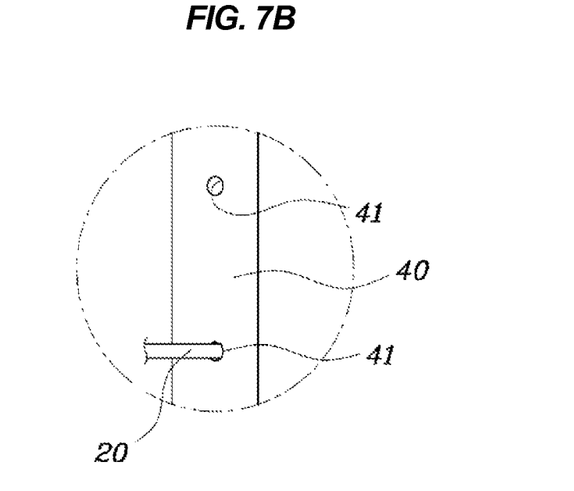
FIG. 7B is an exploded view illustrating a portion of the movable board being moved down according to an exemplary embodiment of the present invention.

When the stopper pin 20 is decoupled from the pin hole 41, as shown in FIGS. 7A and 7B, the movable board 12 is entirely moved down by the force applied by a passenger, and at the same time, the weight 60 connected with the movable board guide 50 via the connection wire 70 is moved up along the stationary board guide 40.

In an aspect of the present invention, when the passenger steps off the board cover 12c in a state where the movable board 12 has been moved down, as shown in FIG. 5, the board cover 12c is moved away from the upper portion of the board body 12a by the elastic force of the board spring 12b acting with opposite forces on the board cover 12c and the board body 12a so that the lower and upper terminals 32 and 33 are separated from each other, being demagnetized. The stopper pin 20 is moved towards the stationary board guide 40 and into the pin hole 41 on the lower side of the stationary board guide 40 by the elastic force of the return spring 37. As a result, the movable board 12 is fixed at the lowered position, and at this state, a passenger can conveniently get on and off a vehicle while stepping on the lowered movable board 12. When the passenger steps on the movable board 12 at a lowered position for getting on and off a vehicle, the passenger gets on and off the vehicle by stepping on a section other than the board cover 12c.

When the passenger intends to raise and return the movable board 12 again to its original position, as described before, the passenger steps on the board cover 12c. The lower and upper terminals 32 and 33 become electrically magnetized again, and the stopper pin 20 is decoupled from the pin hole 41 on the lower side of the stationary board guide 40. In this state, when the passenger gradually steps off the board cover, the weight 60 is moved down along the stationary board guide 40 and the movable board 12 is moved up and returns to its original position as shown in FIG. 3. The returned movable board 12 then maintains its raised original position as the stopper pin 20 is inserted into the pin hole 41 on the upper side of the stationary board guide 40, being in a state ready for the next use.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A running board assembly for a vehicle, comprising:
a stationary board fixed to a vehicle body such that the stationary board does not move relative to the vehicle body;
a movable board separately coupled to the stationary board and selectively movable up and down with respect to the stationary board;
a stopper pin selectively coupling the movable board and the stationary board to stop a vertical motion of the movable board to a predetermined position;
a stopper pin-manipulation unit included in the movable board and connected to the stopper pin;
a stationary board guide fixed to the stationary board; and
a movable board guide fixed to the stationary board guide, the movable board guide movable along the stationary board guide in a vertical direction of the stationary board guide,
wherein when the movable board is subjected to a load, the stopper pin-manipulation unit decouples magnetically the stopper pin from the stationary board,
wherein when the movable board is not subjected to the load, the stopper pin-manipulation unit maintains a state of the stopper pin being coupled to the stationary board,
wherein the stopper pin is mounted in the movable board guide, and the stationary board guide includes a plurality of pin-holes formed with a predetermined vertical interval therebetween along the vertical direction of the stationary board guide, and wherein the stopper pin is selectively inserted and engaged into one of the pin-holes in accordance with movement of the movable board.

2. The running board assembly for the vehicle according to claim 1, further comprising:
- a weight provided adjacent to the stationary board guide and vertically movable along the stationary board guide; and
- a connection wire connecting the movable board guide and the weight.

3. The running board assembly for the vehicle according to claim 1, wherein the movable board comprises:
- a board body to which the movable board guide is fixed;
- a board cover selectively engaged to an upper portion of the board body; and
- a board spring placed between the board body and the board cover and elastically biasing the board cover away from the board body to allow the board cover to extend or retract elastically in the vertical direction.

4. The running board assembly for the vehicle according to claim 3, wherein the stopper pin-manipulation unit comprises:
- a lower terminal fixedly coupled to the upper portion of the board body, wherein a first side of the lower terminal protrudes upwards from the board body and a second side of the lower terminal is mounted to the board body and electrically connected to a power supply;
- an upper terminal fixedly coupled to a lower portion of the board cover, wherein a first side of the upper terminal protrudes downwards from the lower portion of the board cover towards the lower terminal;
- a coil coiled around the upper terminal;
- a movable body that is slidably mounted in the board cover and movable towards the upper terminal when the lower and upper terminals come into contact and the upper terminal is magnetized by an electric current from the power supply; and
- a pin wire connecting the stopper pin and the movable body.

5. The running board assembly for the vehicle according to claim 4, wherein the stopper pin-manipulation unit further comprises:
- a return spring positioned between the stopper pin and the movable board guide at both first and second sides of the return spring respectively and providing an elastic force to move the stopper pin towards the stationary board guide when the lower and upper terminals which were in contact with each other during magnetization are separated, thus being demagnetized.

6. The running board assembly for the vehicle according to claim 4, wherein the stopper pin-manipulation unit further comprises:
- a movable body guide provided to the board cover, the movable body being slidably received in the movable body guide and slides along the movable body guide.

7. A running board assembly for a vehicle, comprising:
- a stationary board fixed to a vehicle body such that the stationary board does not move relative to the vehicle body;
- a movable board separately coupled to the stationary board and selectively movable up and down with respect to the stationary board;
- a stopper pin selectively coupling the movable board and the stationary board to stop a vertical motion of the movable board to a predetermined position;
- a stopper pin-manipulation unit included in the movable board and connected to the stopper pin;
- a stationary board guide fixed to the stationary board; and
- a movable board guide fixed to the stationary board guide, the movable board guide movable along the stationary board guide in a vertical direction of the stationary board guide,
wherein when the movable board is subjected to a load, the stopper pin-manipulation unit decouples magnetically the stopper pin from the stationary board,
wherein when the movable board is not subjected to the load, the stopper pin-manipulation unit maintains a state of the stopper pin being coupled to the stationary board,
wherein the movable board comprises:
- a board body to which the movable board guide is fixed;
- a board cover selectively engaged to an upper portion of the board body; and
- a board spring placed between the board body and the board cover and elastically biasing the board cover away from the board body to allow the board cover to extend or retract elastically in the vertical direction, and
wherein the stopper pin-manipulation unit comprises:
- a lower terminal fixedly coupled to the upper portion of the board body, wherein a first side of the lower terminal protrudes upwards from the board body and a second side of the lower terminal is mounted to the board body and electrically connected to a power supply;
- an upper terminal fixedly coupled to a lower portion of the board cover, wherein a first side of the upper terminal protrudes downwards from the lower portion of the board cover towards the lower terminal;
- a coil coiled around the upper terminal;
- a movable body that is slidably mounted in the board cover and movable towards the upper terminal when the lower and upper terminals come into contact and the upper terminal is magnetized by an electric current from the power supply; and
- a pin wire connecting the stopper pin and the movable body.

8. The running board assembly for the vehicle according to claim 7, wherein the stopper pin-manipulation unit further comprises:
- a return spring positioned between the stopper pin and the movable board guide at both first and second sides of the return spring respectively and providing an elastic force to move the stopper pin towards the stationary board guide when the lower and upper terminals which were in contact with each other during magnetization are separated, thus being demagnetized.

9. The running board assembly for the vehicle according to claim 7, wherein the stopper pin-manipulation unit further comprises:
- a movable body guide provided to the board cover, the movable body being slidably received in the movable body guide and slides along the movable body guide.

* * * * *